(12) United States Patent
Wang

(10) Patent No.: US 9,736,299 B2
(45) Date of Patent: Aug. 15, 2017

(54) METHOD, APPARATUS AND APPLICATION SERVER FOR ASSOCIATING ONE-NUMBER TWO-TERMINAL CALL

(71) Applicant: ZTE Corporation, Shenzhen (CN)

(72) Inventor: Junhui Wang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 41 days.

(21) Appl. No.: 14/654,990

(22) PCT Filed: Aug. 20, 2013

(86) PCT No.: PCT/CN2013/081896
§ 371 (c)(1),
(2) Date: Jun. 23, 2015

(87) PCT Pub. No.: WO2014/101436
PCT Pub. Date: Jul. 3, 2014

(65) Prior Publication Data
US 2015/0350423 A1    Dec. 3, 2015

(30) Foreign Application Priority Data
Dec. 24, 2012    (CN) .......................... 2012 1 0567901

(51) Int. Cl.
*H04M 3/42* (2006.01)
*H04L 1/12* (2006.01)
(Continued)

(52) U.S. Cl.
CPC .......... *H04M 3/42263* (2013.01); *H04L 1/12* (2013.01); *H04L 65/1063* (2013.01);
(Continued)

(58) Field of Classification Search
CPC ... H04L 1/12; H04L 65/1063; H04L 65/1069; H04M 1/0202; H04M 1/03; H04M 3/42263; H04M 7/006
See application file for complete search history.

(56) References Cited

U.S. PATENT DOCUMENTS 7,664,252 B1 * 2/2010 Croak .................... H04M 1/56
370/352
9,049,275 B1 * 6/2015 Newman ............... H04M 9/001
(Continued)

FOREIGN PATENT DOCUMENTS

CN    101123645 A    2/2008
CN    101267474 A    9/2008
(Continued)

OTHER PUBLICATIONS

International Search Report for corresponding application PCT/CN2013/081896 filed Aug. 20, 2013; Mail date Nov. 14, 2013.
(Continued)

*Primary Examiner* — Kashif Siddiqui
(74) *Attorney, Agent, or Firm* — Cantor Colburn LLP

(57) ABSTRACT

A method, an apparatus and an application server for associating one-number two-terminal call are provided. The method is used on the application server and includes: the application server receives a call request sent by a calling terminal for calling one-number two-terminal terminals, and sends the call request to the one-number two-terminal terminals; the application server receives first response information sent by a first terminal in the one-number two-terminal terminals for the call request, and determines whether the first response information meets an associated call condition; and if the determine result indicates that the first response information meets the associated call condition, the application server associates the call request of the calling terminal to a second terminal in the one-number two-terminal terminals.

15 Claims, 6 Drawing Sheets

(51) Int. Cl.
*H04L 29/06* (2006.01)
*H04M 1/02* (2006.01)
*H04M 1/03* (2006.01)
*H04M 7/00* (2006.01)

(52) U.S. Cl.
CPC ...... *H04L 65/1069* (2013.01); *H04M 1/0202* (2013.01); *H04M 1/03* (2013.01); *H04M 7/006* (2013.01)

(56) References Cited

U.S. PATENT DOCUMENTS

| | | |
|---|---|---|
| 9,124,439 B1* | 9/2015 | Li .................... H04L 12/28 |
| 2002/0118676 A1* | 8/2002 | Tonnby ............ H04L 12/2856 370/352 |
| 2003/0125072 A1 | 7/2003 | Dent |
| 2004/0229601 A1* | 11/2004 | Zabawskyj ......... H04W 76/025 455/417 |
| 2006/0018448 A1* | 1/2006 | Stevens ............... H04M 7/0057 379/93.05 |
| 2007/0127678 A1* | 6/2007 | Khan .................... H04M 3/54 379/211.02 |
| 2007/0195752 A1 | 8/2007 | Gayde |
| 2008/0013525 A1* | 1/2008 | Sakaguchi ........ H04L 29/06027 370/352 |

FOREIGN PATENT DOCUMENTS

| | | | |
|---|---|---|---|
| CN | 101291469 A | 10/2008 | |
| CN | 102143284 A | 8/2011 | |
| EP | 1146764 A2 * | 10/2001 | ............. H04W 8/26 |

OTHER PUBLICATIONS

European Search Report for corresponding application EP13868077; Mail date Dec. 2, 2015.

* cited by examiner

METHOD, APPARATUS AND APPLICATION SERVER FOR ASSOCIATING ONE-NUMBER TWO-TERMINAL CALL

TECHNICAL FIELD

The present invention relates to the field of communications, and in particular, to a method, apparatus and application server for associating one-number two-terminal call.

BACKGROUND

The "one-number two-terminal" service refers to a user simultaneously using a fixed telephone and a personal handphone system (PHS) (or cellphone) terminal, with the two terminals sharing the same phone number. The fixed telephone and the PHS using the same number can both act as a calling number or a called number independently, and the communication thereof is not affected. When acting as a called number, both of the two terminals may possibly ring, and will ring simultaneously in the simultaneous ring mode. When acting as a calling number, the two terminals can be used independently and if bundled together, the two terminals can call each other. One acts as a primary number and the other acts as an auxiliary number, but to the outside, they are just one primary number. When a user calls this primary number, the "one-number two-terminal" service calls the primary number and the auxiliary number according to certain rules.

A problem occurs in the situation where both terminals are busy in the "one-number two-terminal" service: a user of fixed telephone A subscribes to the "one-number two-terminal" service, its auxiliary number is PHS (or cellphone) B, and its ring mode is simultaneous ringing. If user C calls number A when A and B are in the "busy" state at the same time, user C either can hear the ring-back tone and wrongfully think that the called party is idle at this moment or cannot hear any sound until automatic hang-up a minute later.

The reason for this problem is: fixed telephone A immediately returns a 486 message when "busy", so that application server AS can immediately learn that fixed telephone A is in the busy state, while PHS (or cellphone) B returns a 183 message when "busy" and then returns a 480 message about a minute later.

If AS mistakes the 183 message of the called party as an idle indication, as shown in FIG. 1, AS sends a 180 idle indication to the calling party upon receiving the 183 message, which causes the calling party to misjudge and think that the called party is idle;

if AS does not process the 183 message, as shown in FIG. 2, then the calling party cannot hear any sound (no prompt at all) during the time the called party returns 183 and 480;

if AS takes 183 as "busy" and hangs up directly, then if PHS (or cellphone) B subscribes to a service such as a ring back tone or a call progress prompt besides "busy", at this moment, the called party is idle or may be idle, but because AS takes 183 as "busy" and hangs up directly, user C cannot talk to B.

The existing solution is to let the core network carry a Reason header field in the 183 message and send it to AS and map the reason value according to the Q.850 protocol, so that after receiving 183+ reason, the service is able to identify whether this speech path is idle or not via the reason header. This technique requires that the current network switches servers SS with all software docked with the "one-number two-terminal" platform, and supports reporting of message 183 carrying the reason value, and the carried reason value is agreed by the standard or is regular.

SUMMARY

The present invention provides a method, apparatus and application server for associating one-number two-terminal call, which can implement a one-number two-terminal associated call, and furthermore, can learn about status of a called terminal accurately and quickly without requiring a core network to support reporting of message 183 that carries a standard reason value.

According to one aspect of the present invention, the present invention provides a method for associating one-number two-terminal call, and the method is applicable to an application server, and the method includes:

receiving a call request sent by a calling terminal for calling one-number two-terminal terminals;

sending the call request to the one-number two-terminal terminals;

receiving the first response information sent by the first terminal in the one-number two-terminal terminals for the call request;

determining whether the first response information meets an associated call condition; and if a determining result indicates that the first response information meets the associated call condition, associating the call request of the calling terminal to the second terminal in the one-number two-terminal terminals.

The associated call condition specifically includes:

the first response information is a call failure event which is not caused by on-hook; and the application server does not receive an idle event returned by the one-number two-terminal terminals.

The one-number two-terminal associated call method further includes:

sending the information acknowledging the reception of the first response information to the first terminal.

The first terminal is a fixed telephone; and the second terminal is a mobile phone.

The step of associating the call request of the calling terminal to a second terminal in the one-number two-terminal terminals includes the steps of:

receiving the second response information sent by the second terminal for the call request;

transparently transmitting the second response information to the calling terminal;

receiving an update media request sent by the calling terminal after receiving the second response information of the second terminal; and assisting a media server corresponding to a core network where the second terminal resides to perform media negotiation with the calling terminal according to the update media request.

The step of assisting a media server corresponding to a core network where the second terminal resides to perform media negotiation with the calling terminal according to the update media request includes the steps of:

sending the update media request which carrying a calling media to the second terminal;

receiving third response information for the update media request of the second terminal, in which media information of the media server is carried; and generating a call progress message and sending same to the calling terminal according to the third response information, the call progress message carrying the media information of the media server.

According to another aspect of the present invention, the embodiments of the present invention also provide an apparatus for associating one-number two-terminal call, and the apparatus is used on an application server, and the apparatus includes a first receiving module configured to receive a call request sent by a calling terminal for calling one-number two-terminal terminals;

a first sending module configured to send the call request to the one-number two-terminal terminals;

a second receiving module configured to receive first response information sent by a first terminal in the one-number two-terminal terminals for the call request;

a determination module configured to determine whether the first response information meets an associated call condition; and an associated call module configured to associate the call request of the calling terminal to a second terminal in the one-number two-terminal terminals if a determining result indicates that the first response information meets the associated call condition.

The associated call condition includes:

the first response information is a call failure event which is not caused by on-hook; and the application server does not receive an idle event returned by the one-number two-terminal terminals.

The one-number two-terminal associated call apparatus further includes:

an acknowledgement information sending module configured to send acknowledgement information acknowledging the reception of the first response information to the first terminal.

The first terminal is a fixed telephone; and the second terminal is a mobile phone.

The associated call module further includes:

a third receiving module configured to receive second response information sent by the second terminal for the call request;

a transmission module configured to transparently transmit the second response information to the calling terminal;

a fourth receiving module configured to receive an update media request sent by the calling terminal after receiving the second response information of the second terminal; and a media negotiation module configured to help a media server corresponding to a core network where the second terminal resides to perform media negotiation with the calling terminal according to the update media request.

The media negotiation module further includes:

a second sending module configured to send the update media request and carry a calling media to the second terminal;

a fifth receiving module configured to receive third response information for the update request of the second terminal, in which media information of the media server is carried; and a call progress message sending module configured to generate a call progress message according to the third response information and send the call progress message to the calling terminal, the call progress message carrying the media information of the media server.

According to yet another aspect of the present invention, the embodiments of the present invention also provide an application server, which includes the apparatus for associating one-number two-terminal call as described in the above.

In the embodiments of the present invention, the application server judges the first response information, and associates the call request of the calling terminal to the second terminal in the one-number two-terminal terminals when the first response information meets the associated call condition. The present invention implements a one-number two-terminal associated call, and furthermore, the application server helps a calling terminal to accomplish media negotiation with a media server corresponding to a core network where a second terminal resides according to the fact that the calling terminal is making an associated call to the second terminal in the one-number two-terminal terminals, and therefore can learn about status of a called terminal accurately and quickly without requiring the core network to support reporting of message 183 that carries a standard reason value.

DETAILED DESCRIPTION OF THE EMBODIMENTS

Figure 1:
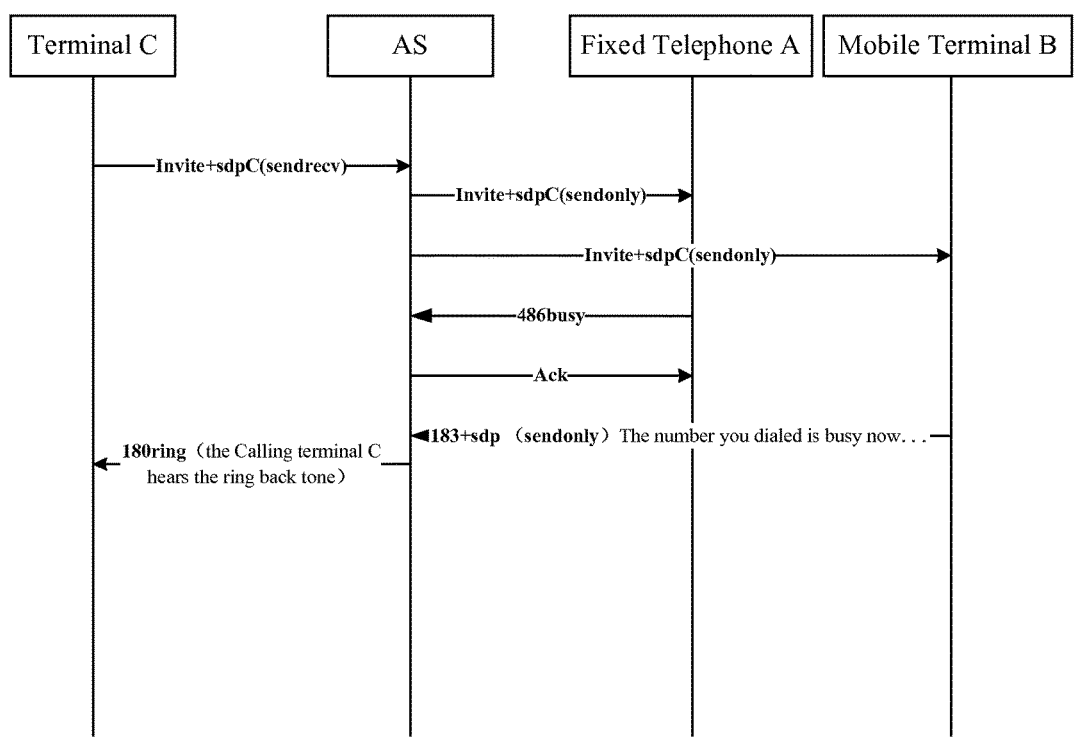
FIG. 1 is a one-number two-terminal signal sending flow chart in the embodiments of the present invention.
Figure 2:
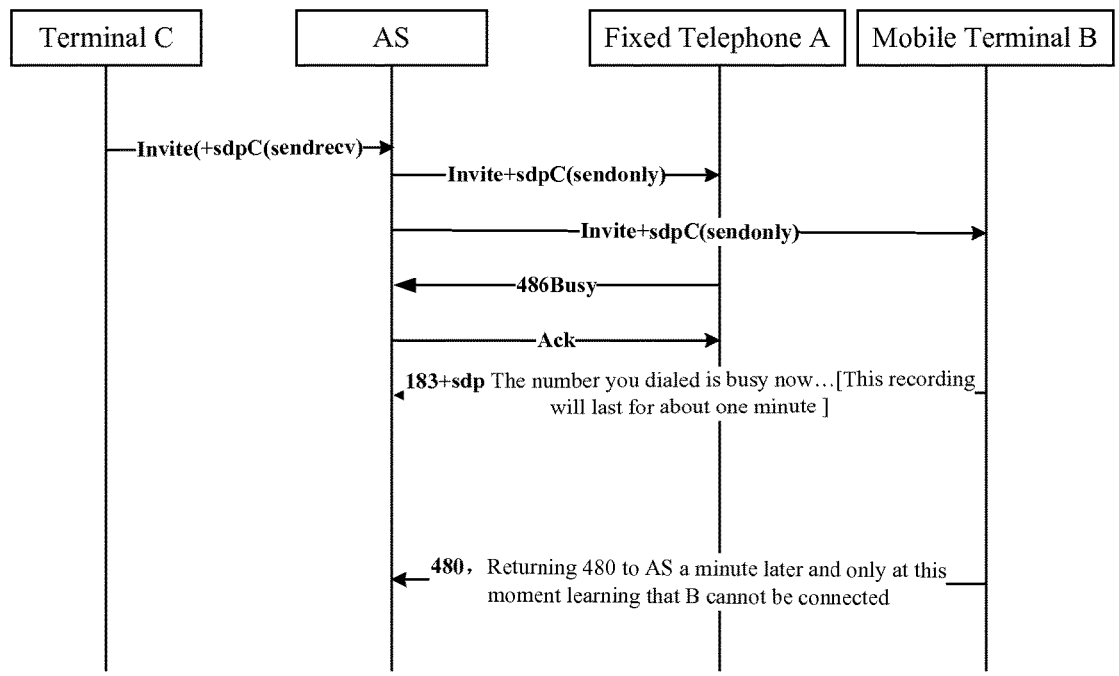
FIG. 2 is another one-number two-terminal signal sending flow chart in the embodiments of the present invention.
Figure 3:
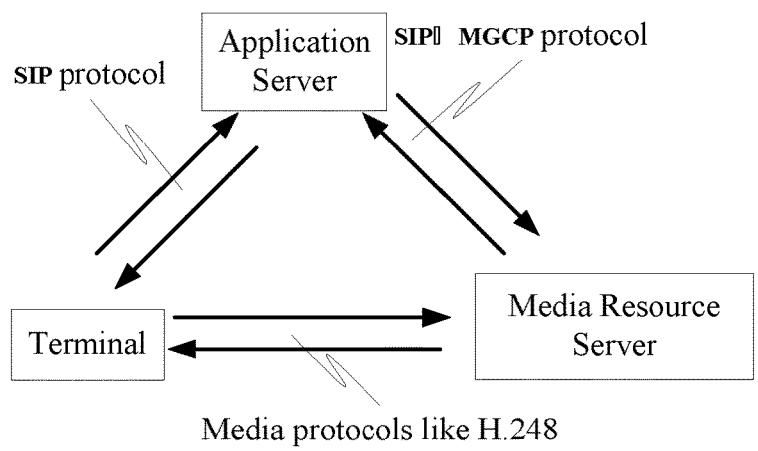
FIG. 3 is a schematic diagram of a network element structure in the embodiments of the present invention.

Before further explanation of the embodiments of the present invention, network element functions involved in the present invention are described first, as shown in FIG. 3:

1. User Terminal (UE)

A device for a user to make a call, answer a call and perform other call operations, such as CDMA or GSM cellphone, PSTN terminal, IMS terminal, etc.

2. Application Server (AS)

providing underlying service capability, such as call control, status report, bill generation, and other functions.

3. Media Resource Server (MRS)

providing voice media capability, usually a media server (MS), such as playing a ring back tone to the calling party when the called party is idle.

In particular, the protocols used by network elements are as follows:

1. AS performs call media negotiation with MRS or UE: AS and UE communicate with each other via a core network using the SIP protocol, and AS and MRS usually use the SIP protocol or the MGCP protocol, specifically depending on the type of protocol supported by MRS.

2. What are transmitted between UE and MRS are media streams: the encoding and decoding formats of specific media packs of UE and MRS, the receiving and sending ports, and the bandwidth transmission rate, etc. are transmitted via media streams according to the media negotiation result between the terminal and MRS during a call.

Figure 4:
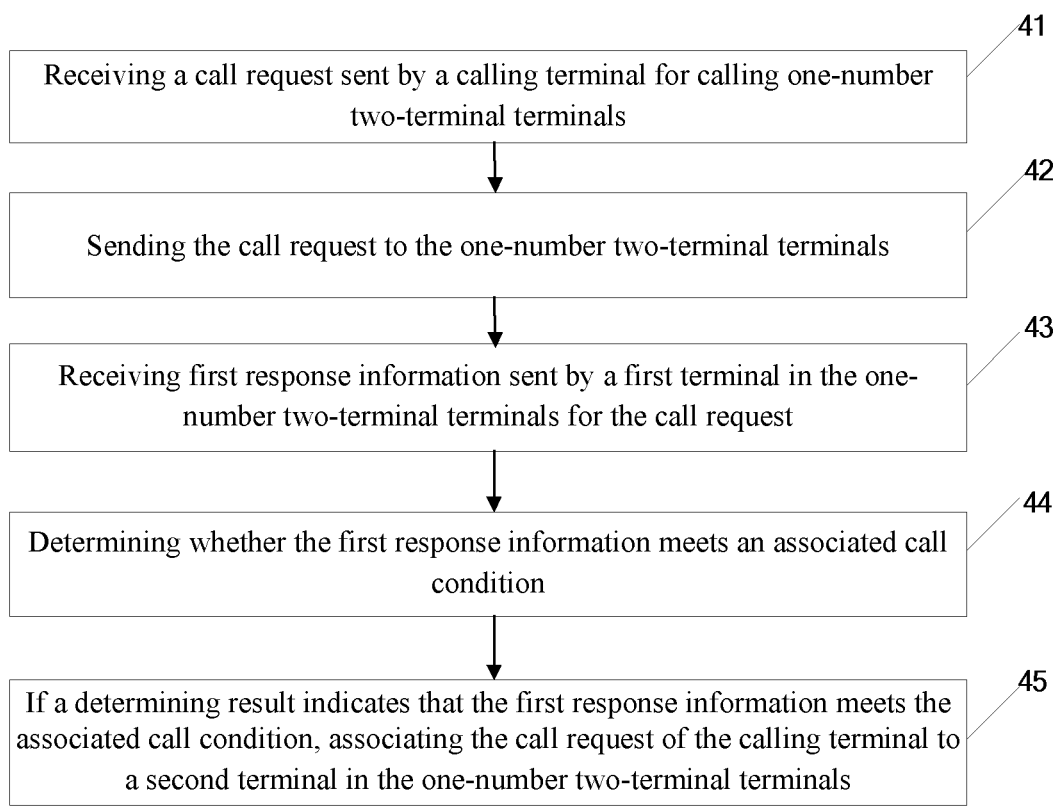
FIG. 4 is a schematic flow chart of a one-number two-terminal associated call method in the embodiments of the present invention.

The embodiments of the present invention provide a method for associating one-number two-terminal call, and the method is applicable to an application server, as shown in FIG. 4, the method includes:

step 41, receiving a call request sent by a calling terminal for calling one-number two-terminal terminals;

step 42, sending the call request to the one-number two-terminal terminals;

step 43, receiving first response information sent by a first terminal in the one-number two-terminal terminals for the call request;

step 44, determining whether the first response information meets an associated call condition; and step 45, if a determining result indicates that the first response information meets the associated call condition, associating the call request of the calling terminal to a second terminal in the one-number two-terminal terminals.

When the application server sends a call request of the calling terminal to the one-number two-terminal terminals simultaneously, the application server will first receive the first response information sent by the first terminal for the call request, and will directly associate the call request of the calling terminal to the second terminal in the one-number two-terminal terminals when the first response information meets the associated call condition, equivalent to the case where the calling terminal directly calls the second terminal. Further, after associating the call request of the calling terminal to the second terminal, the application server will help a media server corresponding to a core network where the second terminal resides to implement media negotiation with the calling terminal and perform media stream transmission according to the result of the media negotiation. The embodiments of the present invention can implement a one-number two-terminal associated call, and furthermore, can learn about status of a called terminal accurately and quickly without requiring a core network to support reporting of message 183 that carries a standard reason value.

Below are Examples

Example 1

In the one-number two-terminal terminals, the first terminal is A and the second terminal is B, and calling terminal C calls the one-number two-terminal terminal; the application server sends a call request of calling terminal C to terminal A and B simultaneously, and receives first response information sent by first terminal A for the call request; at this moment, the application server needs to determine whether the first response information meets an associated call condition, and if yes, the application server will directly associate the call request of calling terminal C to second terminal B.

After assisting calling terminal C and second terminal B implement media negotiation, the application server performs media stream transmission according to the result of the media negotiation; assuming that second terminal B subscribes services like ring back tone, call progress prompt, etc., calling terminal C can learn about status of second terminal B accurately and quickly via a service prompt received.

In the above-mentioned one-number two-terminal associated call method, the associated call condition specifically includes:

the first response information is a call failure event which is not caused by on-hook; and the application server does not receive an idle event returned by the one-number two-terminal terminals.

Preferentially, the above-mentioned one-number two-terminal associated call method further includes:

sending acknowledgement information acknowledging the reception of the first response information to the first terminal.

After associating the call request of the calling terminal to the second terminal, the application server sends acknowledgement information to the first terminal, and at this moment, the call link from the calling terminal to the first terminal does not exist any more, which is as well equivalent to the case where the calling terminal directly calls the second terminal, thereby being able to learn about status of the called terminal accurately and quickly.

In the above-mentioned method for associating one-number two-terminal call, the first terminal is a fixed telephone; and the second terminal is a mobile phone.

As a fixed telephone responds faster to call requests, the application server will receive first response information of the first terminal (i.e., fixed telephone) in the first place; at the same time, the fixed telephone will immediately return a 486 message when "busy", and the application server will not take this message as idle or other instructions and misjudge; therefore, the first terminal is preferentially a fixed telephone; and the second terminal is preferentially a mobile phone.

In the above-mentioned one-number two-terminal associated call method, step 45 further includes:

step 451, receiving second response information for the call request sent by the second terminal;

step 452, transmitting the second response information to the calling terminal;

step 453, receiving an update media request sent by the calling terminal after receiving the second response information of the second terminal;

step 454, assisting a media server corresponding to a core network where the second terminal resides to perform media negotiation with the calling terminal according to the update media request.

As the second terminal is a mobile phone and responds slower, after breaking the link to the first terminal, the application server receives the second response information sent by the second terminal for the call request, and at this moment directly transmits the second response information to the calling terminal, and sends an update media request to the second terminal at the same time, and helps a media server corresponding to a core network where the second terminal resides to perform media negotiation with the calling terminal and perform media stream transmission according to the media negotiation result.

Step 454 further includes:

sending the update request to the second terminal;

receiving third response information of the second terminal for the update request, in which media information of the media server is carried; and generating a call progress message and sending same to the calling terminal according to the third response information, the call progress message carrying the media information of the media server.

Below is an overall description of the above-mentioned method in combination with the reality.

Example 2

Figure 5:
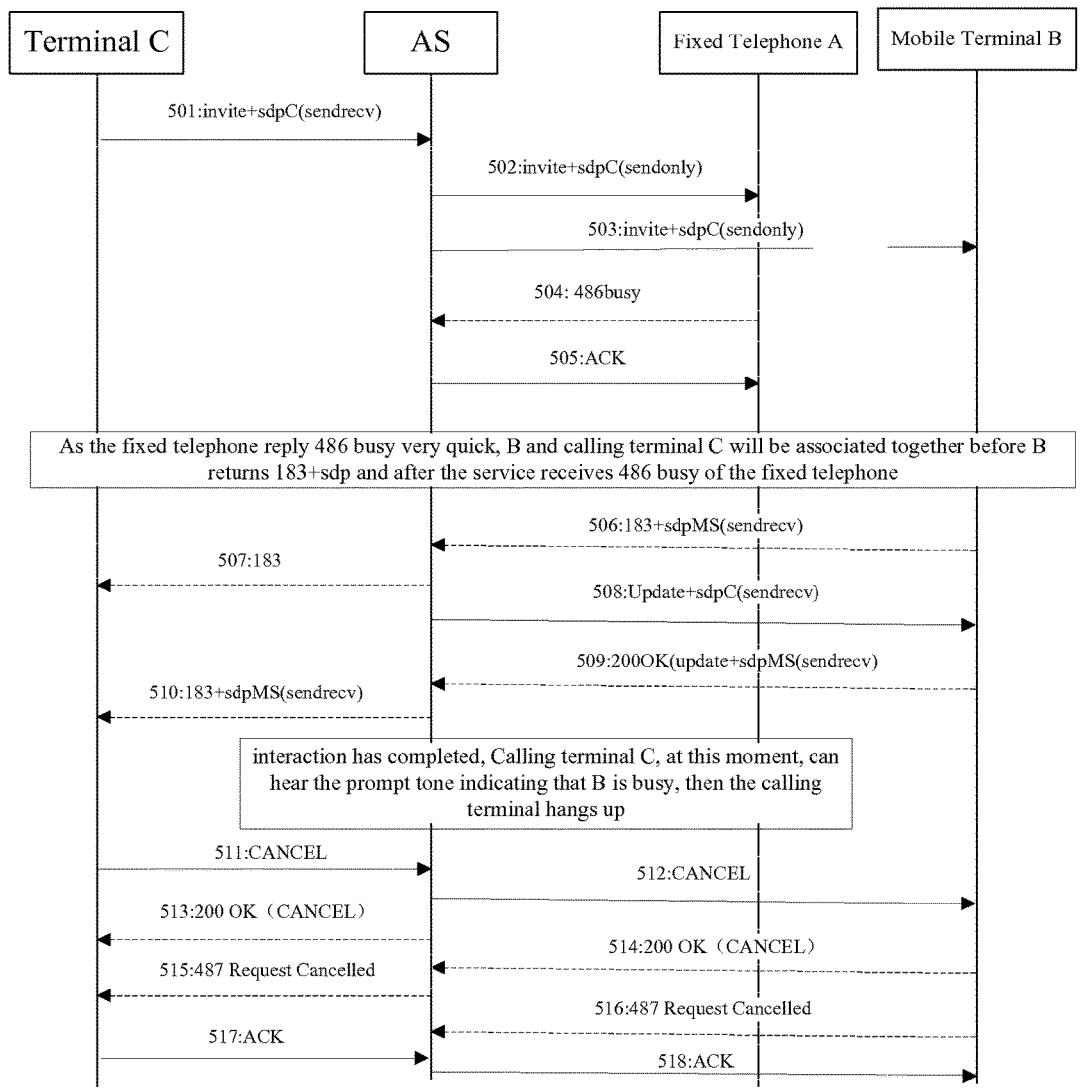
FIG. 5 is a schematic flow chart of an implementation of the embodiments of the present invention.

As shown in FIG. 5, the figure is a signal interaction process for implementing an associated call between a calling terminal and a second terminal and further learning about status of the second terminal when the one-number two-terminal terminals are "busy".

Step 501, the calling terminal C sends a INVITE request to the application server (AS), and the number requested thereby is a one-number two-terminal terminal, in which the first terminal is A and the second terminal is B, and the call request carries media information of calling terminal C, and the direction is "sendrecv".

Step 502, the AS sends a INVITE request to first terminal A, which carries media information of calling terminal C, and the direction is "sendonly".

Step 503, the AS sends a INVITE request to second terminal B, which carries media information of calling terminal C, and the direction is "sendonly".

Step 504, first terminal A returns a 486 busy response to INVITE to application server AS, and associates second terminal B to calling terminal C.

Step 505, the AS sends ACK acknowledgement information that does not carry media information to first terminal A. Since then, the link for calling first terminal A does not exist any more.

Step 506, second terminal B returns a 183+ sdp response to INVITE to the AS, which carries media information of MS, and the direction is "sendrecv".

Step 507, the AS transmits a 183 message that does not carry media information to calling terminal C.

Step 508, the AS sends an Update request that carries media information of calling terminal C to second terminal B, and the direction is "sendrecv".

Step 509, second terminal B returns a 200ok+ sdp response to Update to the AS, which carries media information of MS, and the direction is "sendrecv".

Step 510, the AS sends a 183+ sdp message to C, which carries media information of MS, and the direction is "sendrecv". At this moment, the media negotiation of calling terminal C and MS has completed, and MS plays a "the called party is busy" prompt tone to calling terminal C. At this moment, the associated call has achieved its aim, and furthermore, the "busy" status of the called terminal can been known accurately and quickly without requiring a core network to support reporting of message 183 that carries a standard reason value.

Step 511, calling terminal C hears the prompt tone and hangs up immediately. Calling terminal C sends a CANCEL message to the AS without carrying media.

Step 512, the AS sends a CANCEL message to second terminal B without carrying media.

Step 513, the AS sends a 200OK response to CANCEL to calling terminal C without carrying media information.

Step 514, second terminal B sends a 200OK response to CANCEL to the AS without carrying media information.

Step 515, the AS sends the final response "487 Request Cancelled" to the INVITE request to calling terminal C without carrying media.

Step 516, second terminal B sends the final response "487 Request Cancelled" to the INVITE request to the AS without carrying media.

Step 517, calling terminal C sends ACK to the AS to respond 487.

Step 518, the AS sends ACK to second terminal B to respond 487, and the call ends completely.

Figure 6:
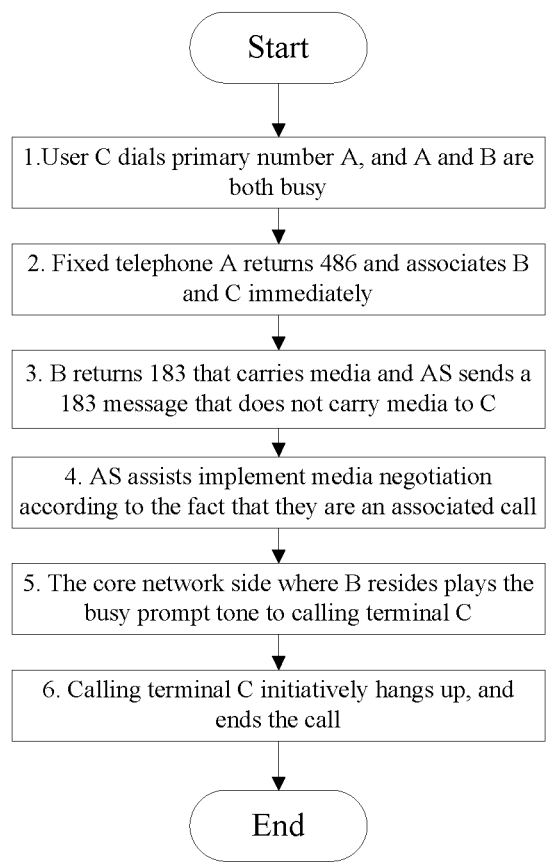
FIG. 6 is a schematic diagram of an associated call signal sending flow in the embodiments of the present invention.

The signalling flow in the above example is implemented step by step, as shown in FIG. 6.

Step 1, user A is a service subscriber, the primary number bundled to him is first terminal fixed telephone A, and the auxiliary number is second terminal PHS (or cellphone) B, user C is any user who calls primary number A, and at this moment A and B are in a conversation;

step 2, first terminal A returns response information, i.e., 486 message, the AS judges the current call information, and the judgement indicates that the received response information is a call failure event which is not caused by on-hook, and the AS does not receive an idle 180 event and immediately associates calling terminal C to second terminal B at this moment;

step 3, second terminal B returns a 183+ sdp event, and AS transmits the 183 message that does not carry media to calling terminal C according to the fact that C and B are already an associated call and according to existing signals;

step 4, AS assists B and C implement media negotiation according to the fact that they are an associated call;

step 5, the core network side where second terminal B resides plays the prompt tone indicating that the called number is "busy" to calling number C;

step 6, calling number C hears the prompt tone indicating that the called number is "busy" and hangs up initiatively.

Figure 7:
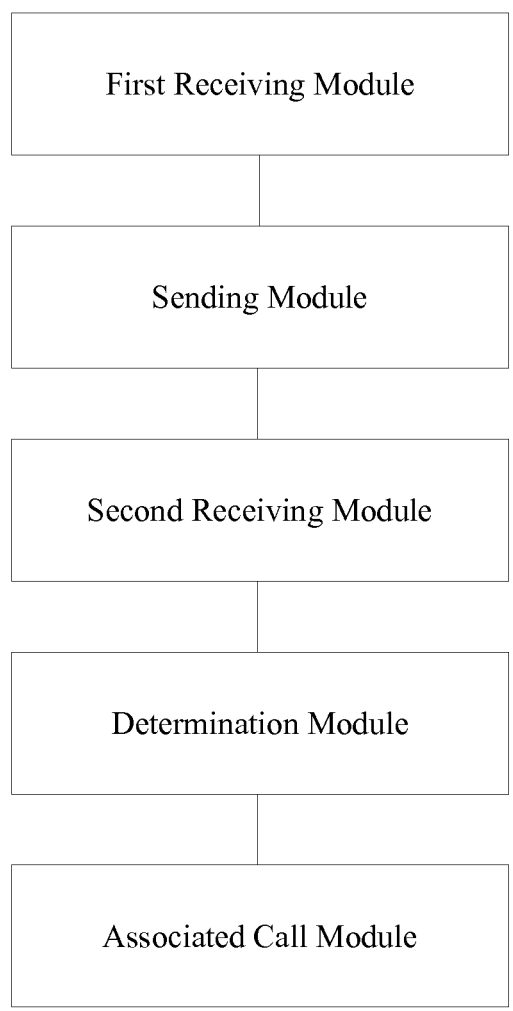
FIG. 7 is a structural schematic diagram of a one-number two-terminal associated call apparatus in the embodiments of the present invention.

The embodiments of the present invention also provide a one-number two-terminal associated call apparatus used on an application server, as shown in FIG. 7, the apparatus includes:

a first receiving module configured to receive a call request sent by a calling terminal for calling one-number two-terminal terminals;

a first sending module configured to send the call request to the one-number two-terminal terminals;

a second receiving module configured to receive first response information sent by a first terminal in the one-number two-terminal terminals for the call request;

a determination module configured to determine whether the first response information meets an associated call condition; and an associated call module configured to associate the call request of the calling terminal to a second terminal in the one-number two-terminal terminals if a determining result indicates that the first response information meets the associated call condition.

The associated call condition specifically includes:

the first response information is a call failure event which is not caused by on-hook; and the application server does not receive an idle event returned by the one-number two-terminal terminals.

The one-number two-terminal associated call apparatus further includes:

an acknowledgement information sending module configured to send acknowledgement information acknowledging the reception of the first response information to the first terminal.

The first terminal is a fixed telephone; and the second terminal is a mobile phone.

The associated call module further includes:

a third receiving module configured to receive second response information sent by the second terminal for the call request;

a transmission module configured to transmit the second response information to the calling terminal;

a fourth receiving module configured to receive an update media request sent by the calling terminal after receiving the second response information of the second terminal; and a media negotiation module configured to help the second terminal to perform media negotiation with the calling terminal according to the update request.

The media negotiation module specifically includes:

a second sending module configured to send the update media request and carry a calling media to the second terminal;

a fifth receiving module configured to receive third response information for the update media request of the second terminal, in which media information of the media server is carried; and a call progress message sending module configured to generate a call progress message and send same to the calling terminal according to the third response information, the call progress message carrying the media information of the media server.

The embodiments of the present invention also provide an application server including the above described apparatus for associating one-number two-terminal call.

What is described above is just preferred implementation of the present invention, and it should be noted that for a technical person skilled in the art, several improvements and embellishments can be made without departing from the principle of the present invention, which should also be regarded as being in the scope of protection of the present invention.

What is claimed is:

1. A method for associating one-number two-terminal call, and the method is applicable to an application server, wherein the method comprises:
   receiving a call request sent by a calling terminal for calling one-number two-terminal terminals;
   sending the call request to the one-number two-terminal terminals;
   receiving first response information sent by a first terminal in the one-number two-terminal terminals in responsive to the call request;
   determining whether the first response information meets an associated call condition; and
   when the determining result indicates that the first response information meets the associated call condition, associating the call request from the calling terminal to a second terminal in the one-number two-terminal terminals, wherein the associated call condition comprises that: the first response information is a call failure event which is not caused by on-hook; and the application server does not receive an idle event returned by the one-number two-terminal terminals.

2. The method according to claim 1, wherein the method further comprises:
   sending information acknowledging the reception of the first response information to the first terminal.

3. The method according to claim 1, wherein the first terminal is a fixed telephone; and the second terminal is a mobile phone.

4. The method according to claim 1, wherein associating the call request of the calling terminal to a second terminal in the one-number two-terminal terminals is:
   receiving second response information sent by the second terminal in response to the call request;
   transparently transmitting the second response information to the calling terminal;
   receiving an update media request sent by the calling terminal after receiving the second response information of the second terminal; and
   assisting a media server corresponding to a core network where the second terminal resides to perform media negotiation with the calling terminal according to the update media request.

5. The method according to claim 4, wherein assisting a media server corresponding to a core network where the second terminal resides to perform media negotiation with the calling terminal according to the update media request is:
   sending the update media request carrying a calling media to the second terminal;
   receiving third response information from the second terminal in response to the update media request, wherein media information of the media server is carried in the third response information; and
   generating a call progress message according to the third response information and sending the call progress message to the calling terminal, wherein the media information of the media server is carried in the call progress message.

6. An apparatus for associating one-number two-terminal call, and the apparatus is used on an application server, wherein the apparatus comprises:
   a first receiving module configured to receive a call request sent by a calling terminal for calling one-number two-terminal terminals;
   a first sending module configured to send the call request to the one-number two-terminal terminals;
   a second receiving module configured to receive first response information sent by a first terminal in the one-number two-terminal terminals in response to the call request;
   a determination module configured to determine whether the first response information meets an associated call condition; and
   an associated call module configured to associate the call request of the calling terminal to a second terminal in the one-number two-terminal terminals if a determining result indicates that the first response information meets the associated call condition, wherein the associated call condition comprises that: the first response information is a call failure event which is not caused by on-hook; and the application server does not receive an idle event returned by the one-number two-terminal terminals.

7. The apparatus according to claim 6, wherein the apparatus further comprises:
   an acknowledgement information sending module configured to send information acknowledging the reception of the first response information to the first terminal.

8. The apparatus according to claim 6, wherein the first terminal is a fixed telephone; and the second terminal is a mobile phone.

9. The apparatus according to claim 6, wherein the associated call module comprises:
   a third receiving module configured to receive second response information sent by the second terminal for the call request;
   a transmission module configured to transparently transmit the second response information to the calling terminal;
   a fourth receiving module configured to receive an update media request sent by the calling terminal after receiving the second response information of the second terminal; and
   a media negotiation module configured to help a media server corresponding to a core network where the second terminal resides to perform media negotiation with the calling terminal according to the update media request.

10. The apparatus according to claim 9, wherein the media negotiation module comprises:
- a second sending module configured to send the update media request and carry a calling media to the second terminal;
- a fifth receiving module configured to receive third response information from the second terminal in responsive to the update request, wherein media information of the media server is carried in the third response information; and
- a call progress message sending module configured to generate a call progress message according to the third response information and send the call progress message to the calling terminal, wherein the media information of the media server is carried in the call progress message.

11. An application server, comprising an apparatus for associating one-number two-terminal call, and the apparatus is used on an application server, wherein the apparatus comprises:
- a first receiving module configured to receive a call request sent by a calling terminal for calling one-number two-terminal terminals;
- a first sending module configured to send the call request to the one-number two-terminal terminals;
- a second receiving module configured to receive first response information sent by a first terminal in the one-number two-terminal terminals in response to the call request;
- a determination module configured to determine whether the first response information meets an associated call condition; and
- an associated call module configured to associate the call request of the calling terminal to a second terminal in the one-number two-terminal terminals if a determining result indicates that the first response information meets the associated call condition, wherein the associated call condition comprises that: the first response information is a call failure event which is not caused by on-hook; and the application server does not receive an idle event returned by the one-number two-terminal terminals.

12. The application server according to claim 11, wherein the apparatus further comprises:
- an acknowledgement information sending module configured to send information acknowledging the reception of the first response information to the first terminal.

13. The application server according to claim 11, wherein the first terminal is a fixed telephone; and the second terminal is a mobile phone.

14. The application server according to claim 11, wherein the associated call module comprises:
- a third receiving module configured to receive second response information sent by the second terminal for the call request;
- a transmission module configured to transparently transmit the second response information to the calling terminal;
- a fourth receiving module configured to receive an update media request sent by the calling terminal after receiving the second response information of the second terminal; and
- a media negotiation module configured to help a media server corresponding to a core network where the second terminal resides to perform media negotiation with the calling terminal according to the update media request.

15. The application server according to claim 14, wherein the media negotiation module comprises:
- a second sending module configured to send the update media request and carry a calling media to the second terminal;
- a fifth receiving module configured to receive third response information from the second terminal in responsive to the update request, wherein media information of the media server is carried in the third response information; and
- a call progress message sending module configured to generate a call progress message according to the third response information and send the call progress message to the calling terminal, wherein the media information of the media server is carried in the call progress message.

* * * * *